(12) United States Patent
Ko et al.

(10) Patent No.: US 12,275,366 B2
(45) Date of Patent: Apr. 15, 2025

(54) AIRBAG FOR SEAT AND METHOD OF CONTROLLING DEPLOYMENT THEREOF

(71) Applicant: HYUNDAI MOBIS CO., LTD., Seoul (KR)

(72) Inventors: Byeong Mann Ko, Yongin-si (KR); Jin Ho Park, Yongin-si (KR); Seok Hoon Ko, Yongin-si (KR); Seok Min Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/475,444

(22) Filed: Sep. 27, 2023

(65) Prior Publication Data

US 2024/0140350 A1 May 2, 2024

(30) Foreign Application Priority Data

Oct. 26, 2022 (KR) .......................... 10-2022-0139462

(51) Int. Cl.
  *B60R 21/2338* (2011.01)
  *B60R 21/207* (2006.01)
  *B60R 21/237* (2006.01)

(52) U.S. Cl.
  CPC ........ *B60R 21/2338* (2013.01); *B60R 21/207* (2013.01); *B60R 21/237* (2013.01); *B60R 2021/23386* (2013.01)

(58) Field of Classification Search
  CPC . B60R 21/2338; B60R 21/207; B60R 21/237; B60R 2021/23386; B60R 2021/01286; B60R 2021/161
  See application file for complete search history.

(56) References Cited

U.S. PATENT DOCUMENTS

| | | | | |
|---|---|---|---|---|
| 3,774,936 A | * | 11/1973 | Barnett | B60R 21/214 280/730.1 |
| 6,116,644 A | * | 9/2000 | Viano | B60R 21/232 280/743.1 |
| 6,170,871 B1 | * | 1/2001 | Goestenkors | B60R 21/2338 280/743.1 |
| 6,254,130 B1 | * | 7/2001 | Jayaraman | B60R 21/233 280/743.1 |

(Continued)

FOREIGN PATENT DOCUMENTS

JP 2020-163977 A 10/2020

*Primary Examiner* — Paul N Dickson
*Assistant Examiner* — Shams Dhanani
(74) *Attorney, Agent, or Firm* — Novo TechIP International PLLC

(57) ABSTRACT

Disclosed are an airbag for a seat capable of quickly and safely supporting an occupant's body parts in order to reduce the risk of injury to the occupant and a method of controlling deployment thereof. The airbag includes an airbag cushion configured to be deployed so as to cover areas ahead of and above a seat, an active wire connected between each of two side surfaces of the seat and a respective one of two side surfaces of the airbag cushion, an active mechanism configured to generate force of pulling the active wire connected to the airbag cushion toward an occupant, and a controller configured to apply an operation command to the active mechanism during operation of the airbag to control the active mechanism to pull the active wire so that the airbag cushion is pulled toward the occupant.

18 Claims, 12 Drawing Sheets

(56) References Cited

U.S. PATENT DOCUMENTS

| | | | |
|---|---|---|---|
| 10,414,371 B2* | 9/2019 | Zhang | B60R 21/2338 |
| 11,225,216 B1* | 1/2022 | Lin | B60R 21/207 |
| 11,285,904 B2* | 3/2022 | Jung | B60R 21/2338 |
| 11,325,554 B1* | 5/2022 | Faruque | B60R 21/01512 |
| 11,383,667 B1* | 7/2022 | Kadam | B60R 21/23138 |
| 11,618,404 B1* | 4/2023 | Jaradi | B60R 21/23138 280/730.1 |
| 11,623,605 B1* | 4/2023 | Kim | B60R 21/2338 280/743.2 |
| 11,845,392 B1* | 12/2023 | Faruque | B60R 21/2338 |
| 11,884,230 B1* | 1/2024 | Faruque | B60R 21/231 |
| 11,891,008 B1* | 2/2024 | Jaradi | B60R 21/2338 |
| 11,951,927 B1* | 4/2024 | Faruque | B60R 21/18 |
| 11,958,431 B1* | 4/2024 | El-Jawahri | B60R 21/2338 |
| 11,975,671 B1* | 5/2024 | Kadam | B60R 21/2338 |
| 12,012,063 B1* | 6/2024 | Jaradi | B60R 21/2072 |
| 2002/0036400 A1 | 3/2002 | Winters | B60R 21/01554 280/743.2 |
| 2002/0158456 A1* | 10/2002 | Fischer | B60R 21/233 280/743.2 |
| 2003/0218325 A1* | 11/2003 | Hasebe | B60R 21/2338 280/743.2 |
| 2004/0090055 A1* | 5/2004 | Kassman | B60R 21/01512 280/743.2 |
| 2004/0256841 A1* | 12/2004 | Bakhsh | B60R 21/2338 280/743.1 |
| 2005/0057029 A1* | 3/2005 | Thomas | B60R 21/233 280/739 |
| 2005/0127648 A1* | 6/2005 | Fischer | B60R 21/2338 280/739 |
| 2006/0066081 A1* | 3/2006 | Kino | B60R 21/213 280/730.2 |
| 2006/0066089 A1* | 3/2006 | Hasebe | B60R 21/233 280/743.1 |
| 2006/0125219 A1* | 6/2006 | Kokeguchi | B60R 21/233 280/735 |
| 2006/0290111 A1* | 12/2006 | Kokeguchi | B60R 21/18 280/739 |
| 2006/0290117 A1* | 12/2006 | Fischer | B60R 21/2338 280/739 |
| 2007/0045997 A1* | 3/2007 | Abe | B60R 21/231 280/739 |
| 2007/0052214 A1* | 3/2007 | Miyata | B62J 27/20 180/219 |
| 2007/0205590 A1* | 9/2007 | Klinkenberger | B60R 21/2338 280/743.2 |
| 2008/0023943 A1* | 1/2008 | Kwon | B60R 21/233 280/728.2 |
| 2012/0104734 A1* | 5/2012 | Fischer | B60R 21/239 280/743.2 |
| 2012/0104737 A1* | 5/2012 | Fischer | B60R 21/2338 280/743.2 |
| 2016/0159306 A1* | 6/2016 | Fujiwara | B60R 21/23138 280/728.2 |
| 2017/0113646 A1* | 4/2017 | Lee | B60R 21/2338 |
| 2017/0136981 A1* | 5/2017 | Fukawatase | B60R 21/235 |
| 2017/0282834 A1* | 10/2017 | Sugie | B60R 21/231 |
| 2017/0291565 A1* | 10/2017 | Yamamoto | B60R 21/2334 |
| 2018/0111581 A1* | 4/2018 | Wang | B60R 21/2338 |
| 2018/0126945 A1* | 5/2018 | Aranzulla | B60R 21/233 |
| 2018/0162313 A1* | 6/2018 | Lee | B60R 21/231 |
| 2018/0222432 A1* | 8/2018 | Schneider | B60R 21/262 |
| 2018/0265029 A1* | 9/2018 | Min | B60R 21/23 |
| 2018/0297550 A1* | 10/2018 | Kitagawa | B60R 21/231 |
| 2019/0016293 A1* | 1/2019 | Saso | B60R 21/23138 |
| 2019/0016294 A1* | 1/2019 | Hayashi | B60R 21/233 |
| 2019/0031133 A1* | 1/2019 | Dry | B60R 21/207 |
| 2019/0054884 A1* | 2/2019 | Dry | B60R 21/2342 |
| 2019/0071046 A1* | 3/2019 | Dry | B60R 21/233 |
| 2019/0111885 A1* | 4/2019 | Hwangbo | B60R 21/214 |
| 2019/0161048 A1* | 5/2019 | Thomas | B60R 21/264 |
| 2019/0161050 A1* | 5/2019 | Schneider | B60R 21/233 |
| 2019/0176739 A1* | 6/2019 | Song | B60R 21/2338 |
| 2019/0217803 A1* | 7/2019 | Dry | B60R 21/2338 |
| 2019/0217805 A1* | 7/2019 | Dry | B60N 2/14 |
| 2019/0248322 A1* | 8/2019 | Herzenstiel | B60R 21/207 |
| 2019/0375363 A1* | 12/2019 | Abe | B60R 21/233 |
| 2020/0070767 A1* | 3/2020 | Kuepper | B60R 21/2171 |
| 2020/0164828 A1* | 5/2020 | Park | B60R 21/207 |
| 2020/0307489 A1* | 10/2020 | Line | B60N 2/682 |
| 2020/0317154 A1* | 10/2020 | Choi | B60R 21/2338 |
| 2020/0384941 A1* | 12/2020 | Kwon | B60R 21/2338 |
| 2020/0391690 A1* | 12/2020 | Faruque | B60R 21/233 |
| 2021/0024031 A1* | 1/2021 | Parker | B60R 21/2338 |
| 2021/0039578 A1* | 2/2021 | Rupp | B60R 21/207 |
| 2021/0094503 A1* | 4/2021 | Farooq | B60N 3/004 |
| 2021/0146875 A1* | 5/2021 | Park | B60R 21/01554 |
| 2021/0179009 A1* | 6/2021 | Lee | B60R 21/233 |
| 2021/0402948 A1* | 12/2021 | Kang | B60R 21/207 |
| 2022/0048459 A1* | 2/2022 | Kang | B60R 21/23138 |
| 2022/0144204 A1* | 5/2022 | Schneider | B60N 2/803 |
| 2022/0274555 A1* | 9/2022 | Matsushita | B60R 21/207 |
| 2022/0332268 A1* | 10/2022 | Jaradi | B60R 21/233 |
| 2022/0348161 A1* | 11/2022 | Faruque | B60R 21/233 |
| 2022/0388472 A1* | 12/2022 | Hwangbo | B60R 21/23138 |
| 2023/0067856 A1* | 3/2023 | Min | B60R 21/233 |
| 2023/0356687 A1* | 11/2023 | Kim | B60R 21/239 |
| 2023/0406258 A1* | 12/2023 | Line | B60R 21/214 |
| 2024/0025370 A1* | 1/2024 | Faruque | B60R 21/2338 |
| 2024/0123937 A1* | 4/2024 | Ohno | B60R 21/2338 |
| 2024/0140346 A1* | 5/2024 | Nagasawa | B60R 21/233 |
| 2024/0181985 A1* | 6/2024 | Kim | B60R 21/2338 |
| 2024/0246506 A1* | 7/2024 | Farooq | B60R 21/2338 |
| 2025/0026302 A1* | 1/2025 | Iwama | B60R 21/233 |

* cited by examiner

AIRBAG FOR SEAT AND METHOD OF CONTROLLING DEPLOYMENT THEREOF

CROSS-REFERENCE TO RELATED APPLICATIONS

This application claims the priority benefit of Korean Patent Application No. 10-2022-0139462, filed on Oct. 26, 2022 in the Korean Intellectual Property Office, the disclosure of which is incorporated herein by reference.

TECHNICAL FIELD

The present invention relates to an airbag for a seat capable of quickly and safely supporting an occupant's body parts in order to reduce the risk of injury to the occupant.

BACKGROUND

With the recent development of autonomous vehicles, the interior space thereof is expected to greatly change.

That is, a vehicle seat is designed to have various seating modes, such as a face-to-face mode, a relaxation mode, a long slide mode, and a swivel mode, so that an occupant sits in the seat in various seating postures.

In particular, because an occupant is free to do something other than drive due to the autonomous driving function of a vehicle, it is expected that the size of a passenger compartment of a vehicle will be increased and accordingly, application of an independent seat will be increased in order to provide a comfortable journey to an occupant.

However, because freedom of seating postures of occupants is increased during autonomous driving of a vehicle, many occupants may not want to wear seat belts. Furthermore, due to recent design trends with emphasis on ride comfort and convenience of occupants, it may become difficult to protect occupants.

Therefore, it is desirable to mount an additional airbag as well as a conventional airbag to a seat in order to protect occupants more safely.

The information disclosed in this Background of the Invention section is only for enhancement of understanding of the general background of the invention, and should not be taken as an acknowledgement or any form of suggestion that this information forms the related art already known to a person skilled in the art.

SUMMARY

Therefore, the present invention has been made in view of the above problems, and it is an object of the present invention to provide an airbag for a seat capable of quickly and safely supporting an occupant's body parts in order to reduce the risk of injury to the occupant.

In accordance with an aspect of the present invention, the above and other objects can be accomplished by the provision of an airbag for a seat, the airbag including an airbag cushion configured to be deployed so as to cover areas ahead of and above a seat, an active wire connected between each of two side surfaces of the seat and a respective one of two side surfaces of the airbag cushion, an active mechanism configured to generate force of pulling the active wire connected to the airbag cushion toward an occupant, and a controller configured to apply an operation command to the active mechanism during operation of the airbag to control the active mechanism to pull the active wire so that the airbag cushion is pulled toward the occupant.

The airbag may further include a plurality of connection wires connected between each of the two side surfaces of the seat and a respective one of the two side surfaces of the airbag cushion and arranged in a deployment direction of the airbag cushion. When the airbag cushion is deployed, the plurality of connection wires is tensioned to cause the airbag cushion to be deployed in a predetermined shape.

The airbag may further include a support member provided on each of the two side surfaces of the seat, and the active wire may pass through the support member to be connected to the active mechanism.

The airbag may further include a support member provided on each of the two side surfaces of the seat, and the plurality of connection wires may be hinged to the support member.

The support member may be formed so as to be elongated in the deployment direction of the airbag cushion.

The active wire may be connected to a portion of the airbag cushion that covers an area ahead of the seat.

The airbag may further include a load limiting device connected to the active mechanism to allow the active wire to be released by load of the occupant applied to the airbag cushion.

The airbag cushion may be deployed forward from the upper end of the seat.

The airbag may further include an airbag module mounted on the upper end of the seat, and the airbag cushion may be accommodated in a folded state in the airbag module.

The airbag cushion may be provided on each of the two side surfaces thereof with connection rings, and the active wire and the plurality of connection wires may be connected to the connection rings.

The airbag cushion may include a bent portion formed so as to cover an area ahead of the seat and to be bent toward the occupant to cause an upper body of the occupant to be directly loaded on the airbag cushion.

The airbag cushion may include a tether connected between a start point of the bent portion and an end point of the bent portion.

The airbag cushion may include lateral inactive zones formed in the two side surfaces thereof so as not to allow injection of gas thereinto, and the bent portion may be bent from a portion adjacent to the lateral inactive zones.

The lateral inactive zones may be formed immediately behind the start point of the bent portion.

The lateral inactive zones may be formed at an intermediate point of the bent portion.

The airbag cushion may include an active zone formed between the lateral inactive zones formed at the intermediate point of the bent portion so as to allow injection of gas thereinto.

The active wire may be provided in plural, and at least one of the plurality of active wires may be connected to each of the two side surfaces of the airbag cushion between the intermediate point of the bent portion and the end point of the bent portion.

At least one of the plurality of connection wires may be connected to each of the two side surfaces of the airbag cushion between the start point of the bent portion and the end point of the bent portion.

In accordance with another aspect of the present invention, there is provided a method of controlling deployment of the airbag for a seat described above, the method including applying, by the controller, an operation command to the active mechanism during operation of the airbag to control the active mechanism to pull the active wire so that the airbag cushion is pulled toward the occupant.

The method may further include releasing, by the load limiting device connected to the active mechanism, the active wire when the active wire is pulled by load of the occupant applied to the airbag cushion.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION

Figure 1:
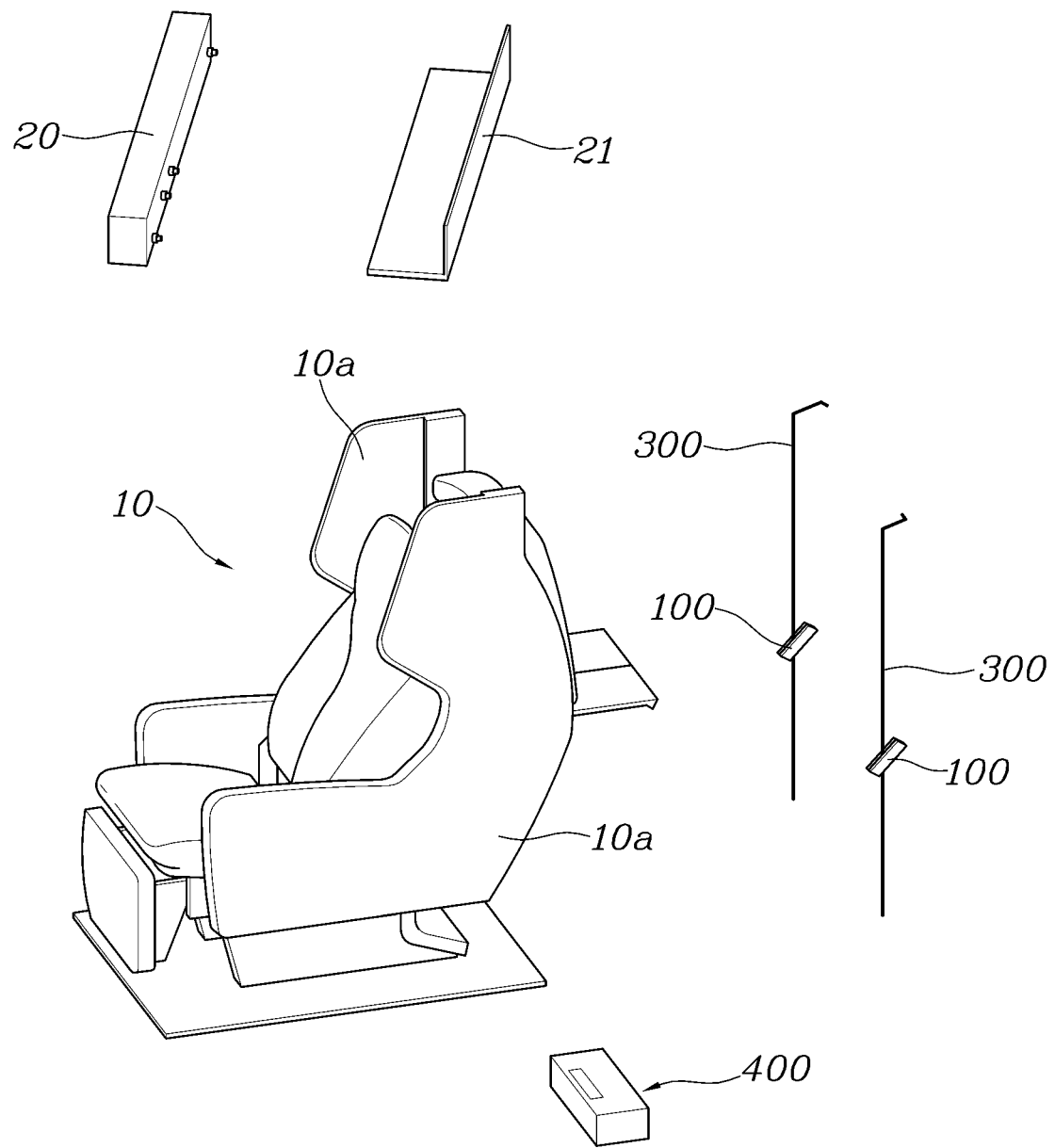
FIG. 1 is an exploded perspective view of an airbag according to the present invention.

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and spirit of the present invention.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

In order to control the function peculiar thereto, a controller may include a communication device, which communicates with other controllers or sensors, a memory, which stores therein an operating system, logic commands, and input/output information, and one or more processors, which perform determinations, calculations, and decisions necessary for control of the function peculiar thereto.

Hereinafter, exemplary embodiments of the present invention will be described in detail with reference to the accompanying drawings.

Figure 2:
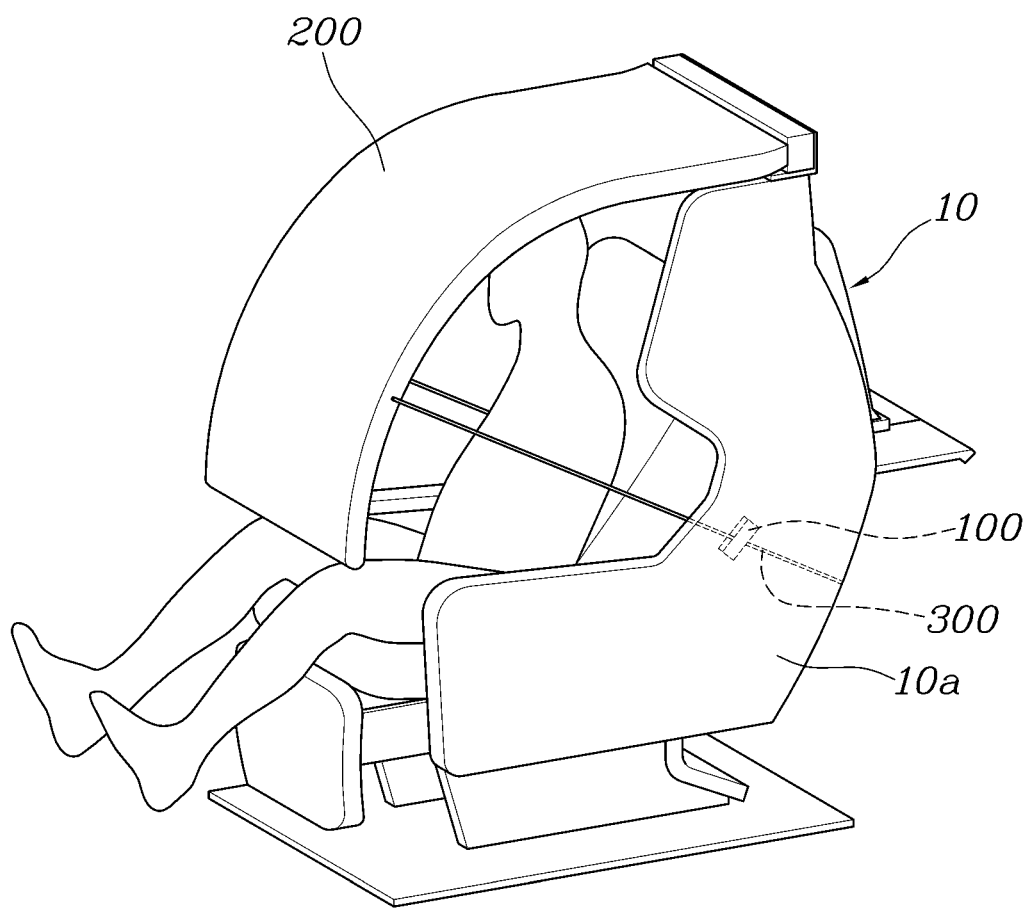
FIG. 2 is a perspective view showing a state in which the airbag according to present invention is deployed, with an active wire unfolded.
Figure 3:
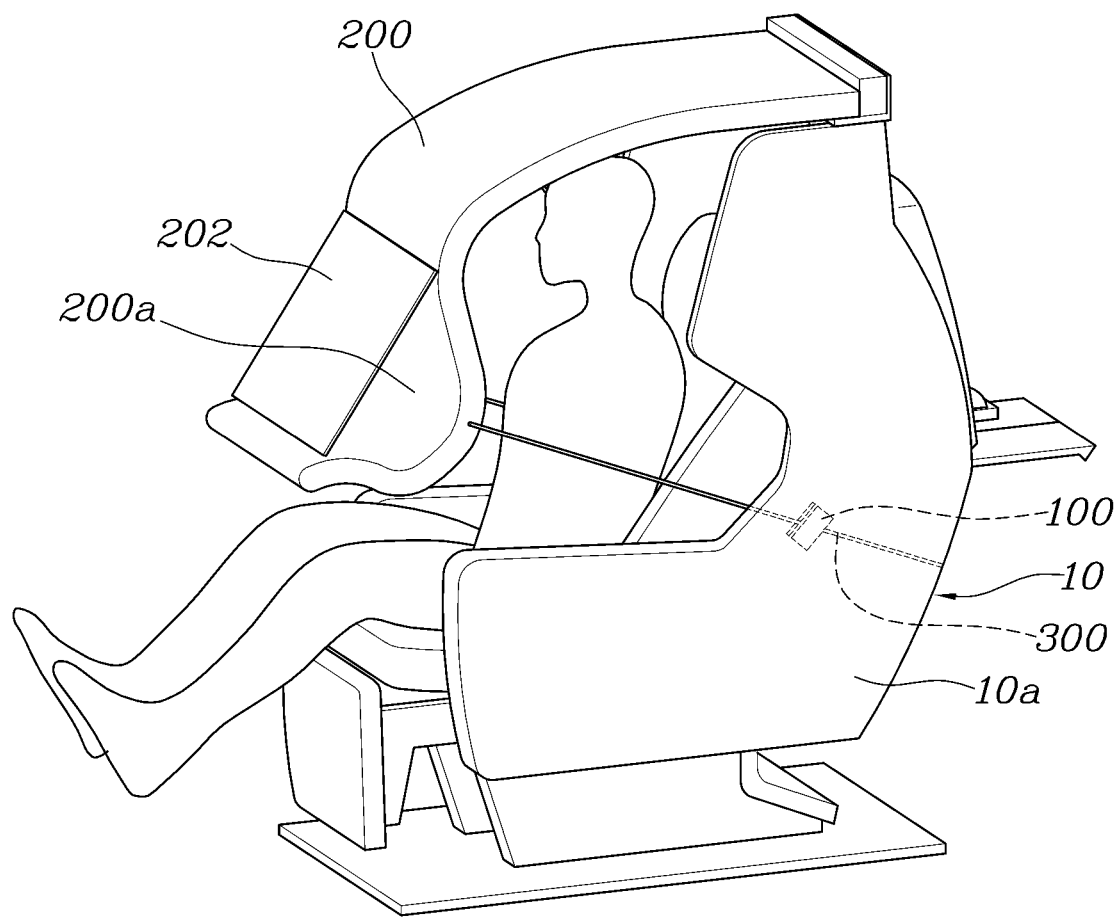
FIG. 3 is a perspective view showing a state in which the airbag including a bent portion according to the present invention is deployed, with the active wire unfolded.

FIG. 1 is an exploded perspective view of an airbag according to the present invention. FIG. 2 is a perspective view showing a state in which the airbag according to present invention is deployed, with an active wire 300 unfolded. FIG. 3 is a perspective view showing a state in which the airbag including a bent portion according to the present invention is deployed, with the active wire 300 unfolded.

Referring to the drawings, the airbag according to the present invention includes an airbag cushion 200 configured to be deployed so as to cover areas in front (or ahead) of and above a seat 10, one or more active wires 300 connected to and extending between each of both side surfaces (or side portions) of the seat 10 and a respective one of both side surfaces (or side portions) of the airbag cushion 200, an active mechanism 400 configured to generate force of pulling the active wire 300 connected to the airbag cushion 200 toward an occupant, and a controller configured to apply an operation command to the active mechanism 400 during operation of the airbag to control the active mechanism 400 to pull the active wire 300 so that the airbag cushion 200 is pulled toward the occupant.

For example, the active wire 300 extends along each of both side surfaces of the seat 10 such that one end thereof is connected to the airbag cushion 200 and the other end thereof is connected to the active mechanism 400.

The active wire 300 is configured to be unfolded in the direction in which the airbag cushion 200 is deployed. Therefore, when the airbag cushion 200 is deployed, the active wire 300 is tensioned so that the airbag cushion 200 is deployed in a predetermined shape.

In particular, when the airbag cushion 200 is deployed, the active wire 300 is pulled by the active mechanism 400, whereby the airbag cushion 200 is pulled toward the occupant.

Accordingly, the airbag cushion 200 is deployed from an area above the head of the occupant sitting in the seat 10 to an area ahead of the occupant so as to cover the upper body of the occupant. Furthermore, since the airbag cushion 200 is pulled toward the occupant while being deployed, the occupant's body parts are rapidly loaded on the airbag cushion 200.

Therefore, the airbag cushion 200 rapidly and stably restrains the occupant loaded thereon, thereby safely protecting the occupant.

The active mechanism 400 may be equipped with a pretensioner structure for use in a seat belt.

Figure 4:
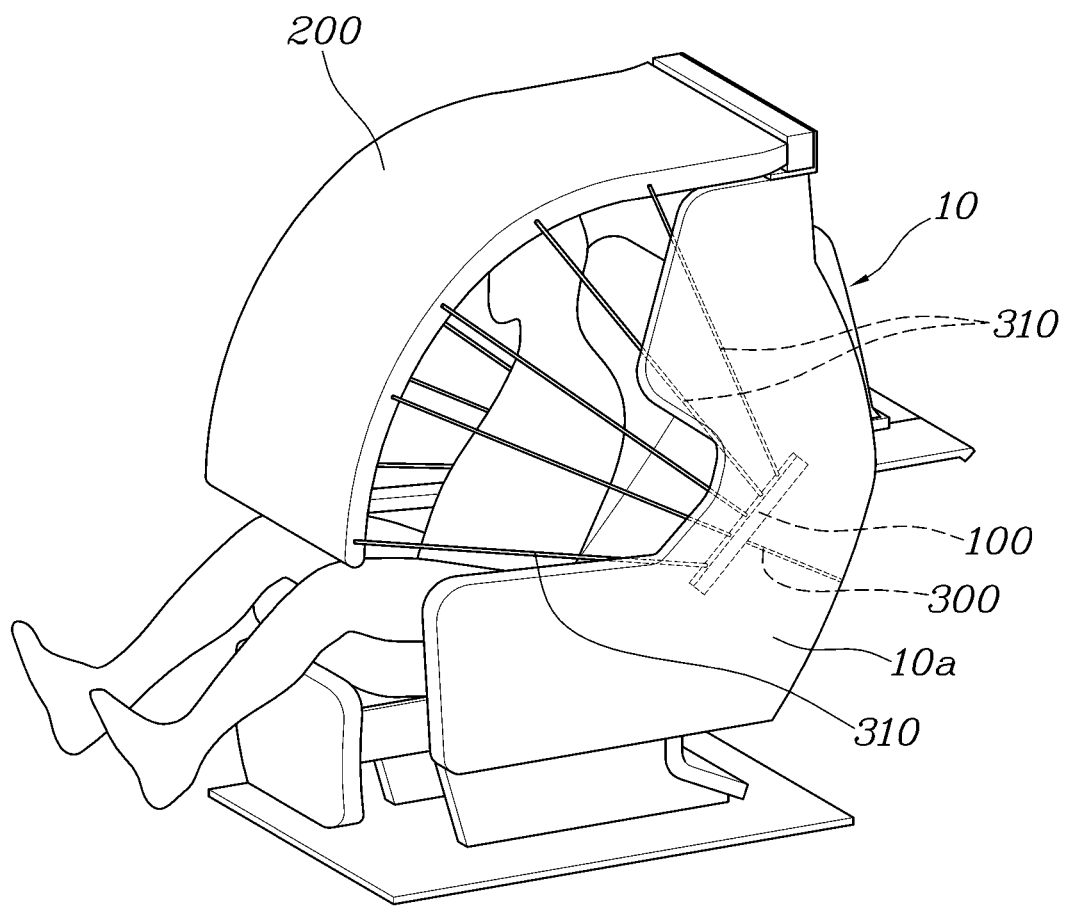
FIG. 4 is a perspective view showing a state in which the airbag according to the present invention is deployed, with the active wire and connection wires spread.
Figure 5:
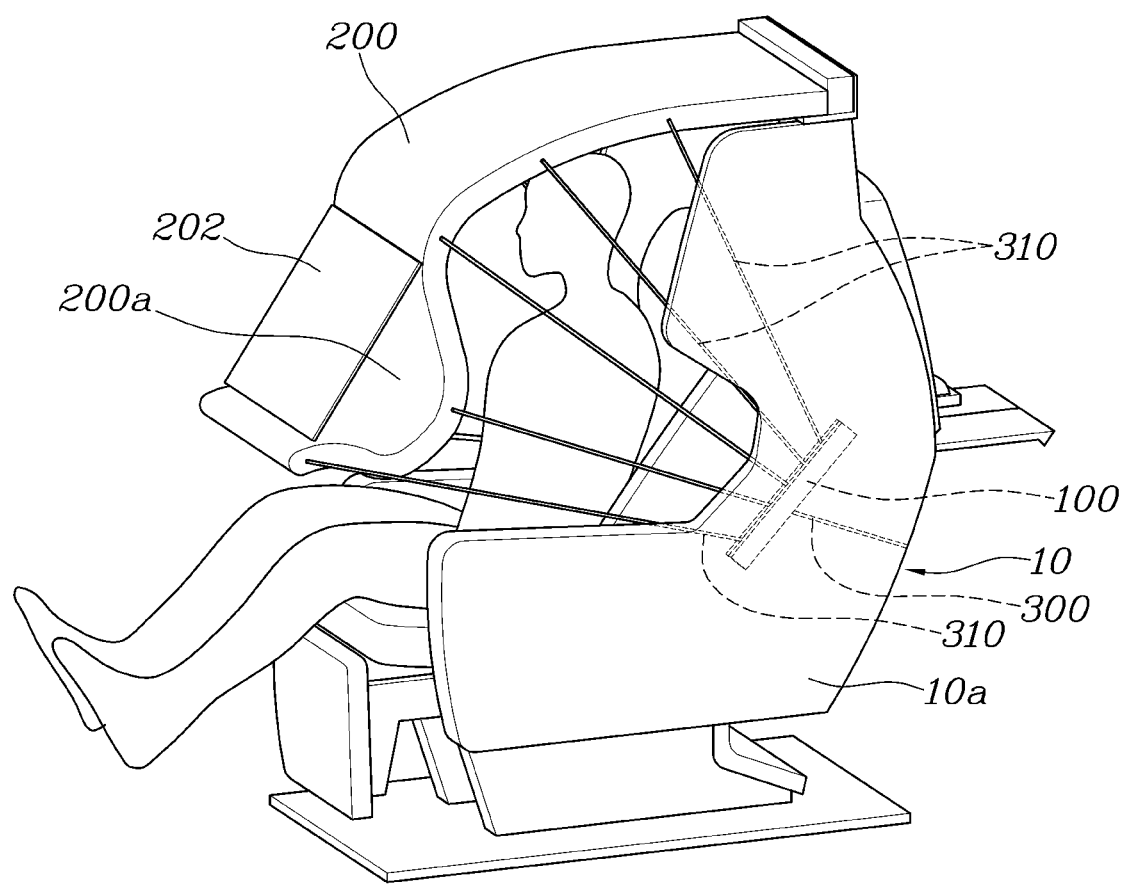
FIG. 5 is a perspective view showing a state in which the airbag including a bent portion according to the present invention is deployed, with the active wire and the connection wires spread.

FIG. 4 is a perspective view showing a state in which the airbag according to the present invention is deployed, with the active wire 300 and one or more connection wires 310 spread. FIG. 5 is a perspective view showing a state in which the airbag including a bent portion according to the present invention is deployed, with the active wire 300 and the connection wires 310 spread.

Referring to the drawings, the airbag according to the present invention further includes a plurality of connection wires 310 connected between each of both side surfaces of the seat 10 and a respective one of both side surfaces of the airbag cushion 200 and arranged in the direction in which the airbag cushion 200 is deployed. When the airbag cushion 200 is deployed, the connection wires 310 are tensioned so that the airbag cushion 200 is deployed in a predetermined shape.

In detail, the plurality of connection wires 310 is connected to the airbag cushion 200 in the shape of ribs of a fan in the deployment direction of the airbag cushion 200. Therefore, when the airbag cushion 200 is deployed, the connection wires 310 are tensioned, whereby the airbag cushion 200 is deployed in a predetermined shape.

Accordingly, the deployment shape of the airbag cushion 200 may be formed more reliably.

In addition, as shown in FIGS. 2 and 3, a support member 100 may be provided on each of both side surfaces of the seat 10, and the active wire 300 may pass through the support member 100 to be connected to the active mechanism 400.

For example, a sidewall 10a is provided on each of both sides of the seat 10, and the support member 100 is provided on the inner surface of the sidewall 10a.

The bottom of the support member 100 is perforated, and the active wire 300 passes through the perforated portion of the support member 100.

The active wire 300 penetrating the support member 100 extends to the rear side of the seat 10 along the side surface of the seat 10, and the active mechanism 400 is mounted on the rear side of the seat 10. Accordingly, the active wire 300 may be connected to the active mechanism 400 located on the rear side of the seat 10.

In this case, the active wire 300 extending along one of both side surfaces of the seat 10 and the active wire 300 extending along the other of both side surfaces of the seat 10 may be connected to the active mechanism 400 in the state in which ends thereof are merged.

As shown in FIGS. 4 and 5, a support member 100 may be provided on each of both side surfaces of the seat 10, and the connection wires 310 may be hinged to the support member 100.

For example, one end of each of the connection wires 310 is connected to the airbag cushion 200, and the other end of each of the connection wires 310 extends along the side surface of the seat 10 to be connected to the support member 100.

The support member 100 is formed so as to be elongated in a predetermined direction, and the connection wires 310 are arranged in the longitudinal direction of the support member 100. The other end of each of the connection wires 310 is hinged to the support member 100 so as to be rotatable.

Before the airbag cushion 200 is deployed, the connection wires 310 are in a state of overlapping each other on the rear side of the seat 10.

In this state, when the airbag cushion 200 is deployed, the upper ends of the connection wires 310 are moved in the direction in which the airbag cushion 200 is deployed, and the lower ends of the connection wires 310 pivot in the support member 100.

Therefore, the connection wires 310 are spread in the direction in which the airbag cushion 200 is deployed. Accordingly, additional tension is applied to the airbag cushion 200 by the connection wires 310 in the deployment process of the airbag cushion 200, whereby the airbag cushion 200 is deployed in a predetermined shape.

Preferably, the support member 100 may be formed so as to be elongated in the deployment direction of the airbag cushion 200.

Figure 10:
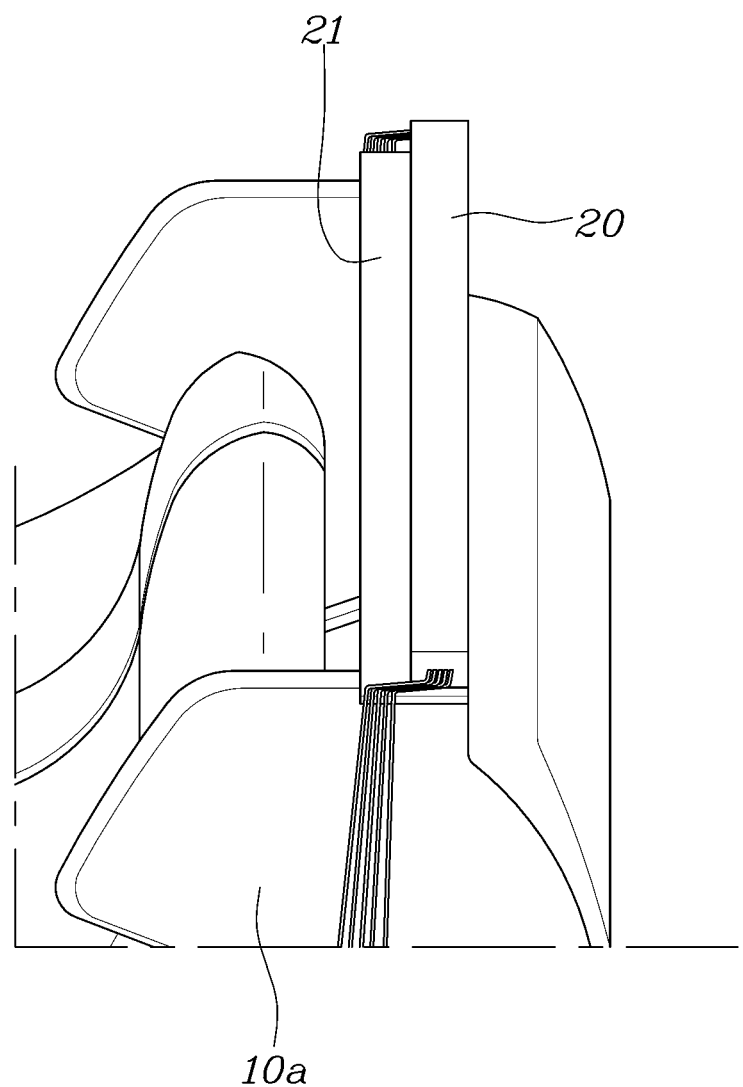
FIG. 10 is a view showing a configuration in which an airbag module according to the present invention is mounted on the upper end of a seat.

In detail, as shown in FIGS. 4 and 10, the airbag cushion 200 is deployed from the rear upper end (or upper portion) of the seat 10 toward the front lower end of the seat 10.

Accordingly, the support member 100 to which the connection wires 310 are hinged is formed so as to extend in a direction from the rear upper end of the seat 10 toward the front lower end of the seat 10. When the airbag cushion 200 is deployed, the connection wires 310 are rotated in the deployment direction of the airbag cushion 200, thereby improving the deployment performance of the airbag cushion 200. As a result, the airbag cushion 200 is deployed stably.

Referring to FIG. 5, the active wire 300 may be connected to a portion of the airbag cushion 200 that covers the area ahead of the seat 10.

Preferably, the active wire 300 may be connected to a lower end portion of the portion of the airbag cushion 200 that covers the area ahead of the seat 10. In this case, at least one active wire 300 may be connected thereto on each of both side surfaces of the airbag cushion 200.

Figure 7:
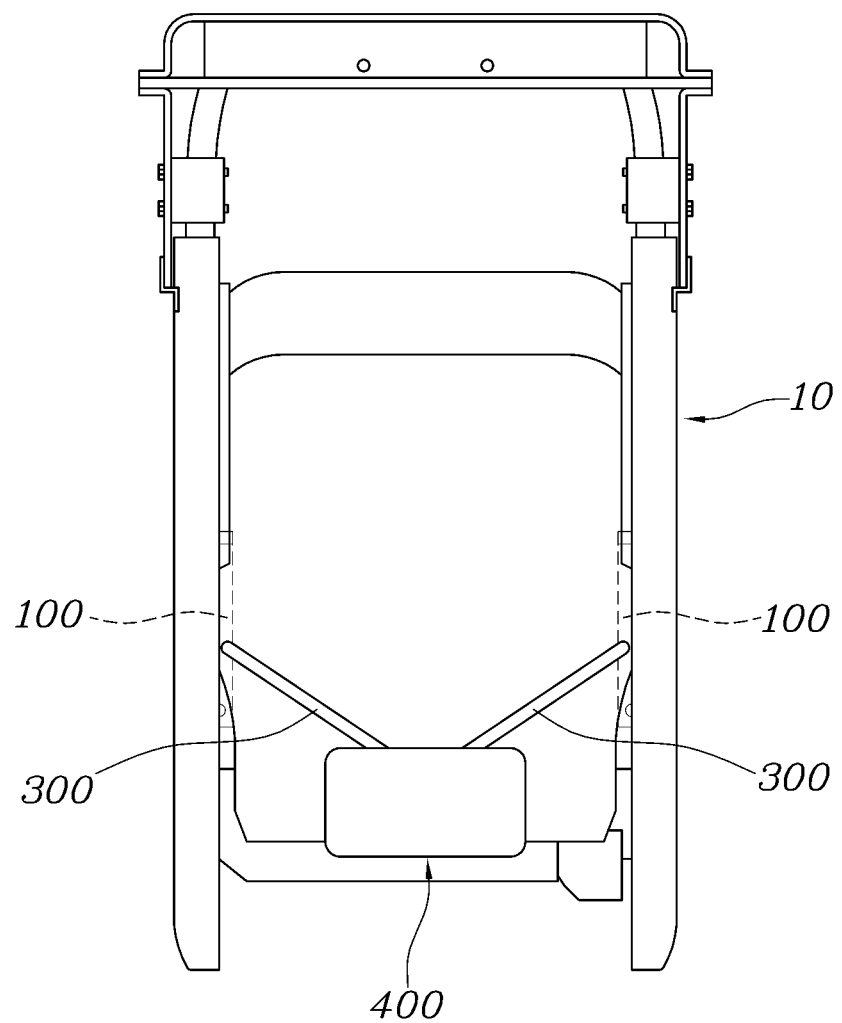
FIG. 7 is a view showing the mounting position of an active mechanism according to the present invention.
Figure 8:
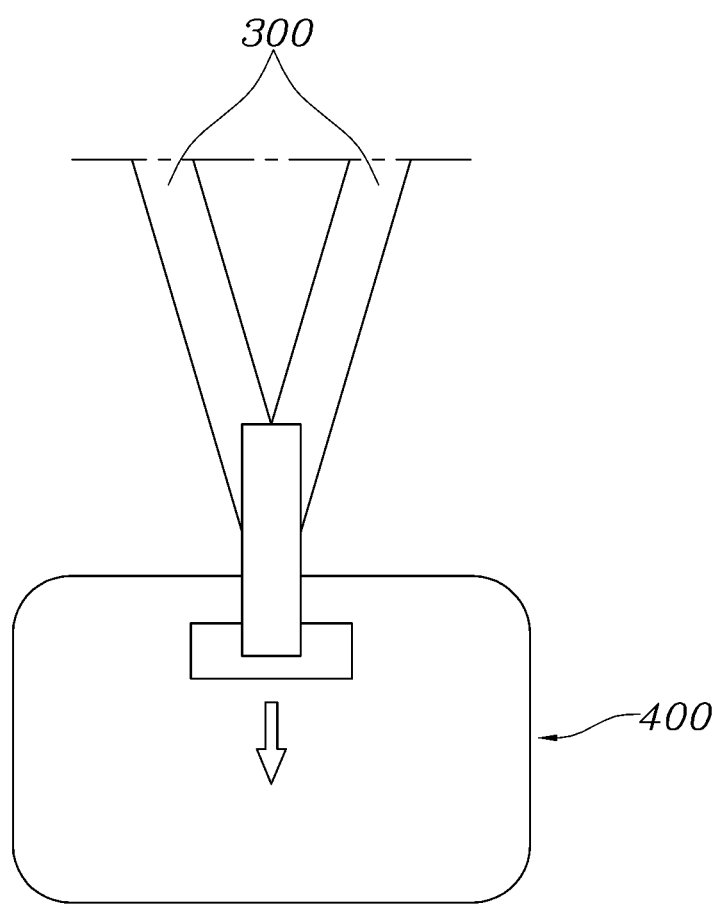
FIG. 8 is a view conceptually showing the operational state of the active mechanism according to the present invention.

FIG. 7 is a view showing the mounting position of the active mechanism 400 according to the present invention. FIG. 8 is a view conceptually showing the operational state of the active mechanism 400 according to the present invention.

Referring to the drawings, a load limiting device 410 may be connected to the active mechanism 400 so that the active wire 300 is released when pulled by the load of the occupant applied to the airbag cushion 200.

Figure 9:
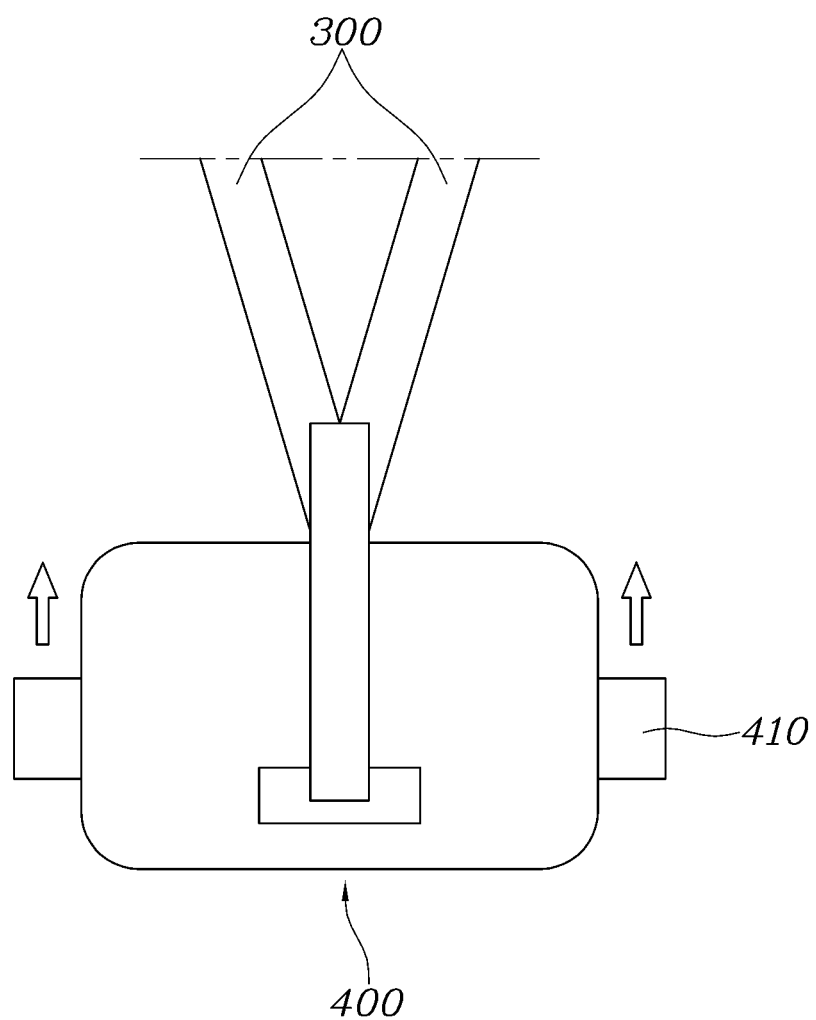
FIG. 9 is a view conceptually showing the operational state of a load limiting device according to the present invention.

FIG. 9 is a view conceptually showing the operational state of the load limiting device 410 according to the present invention. When the occupant is loaded on the airbag cushion 200, the load of the occupant is applied to the airbag cushion 200, and thus the airbag cushion 200 is pushed forward.

In this case, when the load of the occupant applied to the airbag cushion 200 exceeds load set by the load limiting device 410, the load limiting device 410 operates so that the active wire 300 is released slowly.

Therefore, the airbag cushion 200 restrains the occupant while being moved in the direction in which the occupant is loaded thereon, thereby mitigating impact generated by collision of the occupant with the airbag cushion 200, thus safely protecting the occupant.

The load limiting device 410 may be implemented as a load limiter attached to the aforementioned pretensioner for use in a seat belt.

FIG. 10 is a view showing a configuration in which an airbag module 20 according to the present invention is mounted on the upper end of the seat 10.

Referring to the drawing, the airbag cushion 200 may be deployed forward from the upper end of the seat 10.

The airbag cushion 200 may be maintained in a folded state in the airbag module 20, and the airbag module 20 may be mounted on the upper end of the seat 10.

In detail, a plate 21 is mounted on the upper end of the seat 10 so as to be elongated in a leftward-rightward direction, and the airbag module 20 is bolted to the plate 21.

The airbag cushion 200 is accommodated in a folded state in the airbag module 20. The airbag cushion 200 may be folded in a zigzag pattern so as to be easily folded and accommodated in the airbag module 20.

In addition, an inflator is connected to the airbag cushion 200 in order to supply gas to the airbag cushion 200. In addition, a cover is provided to cover the airbag module 20 in order to protect the airbag module 20 from foreign substances and impact.

Figure 11:
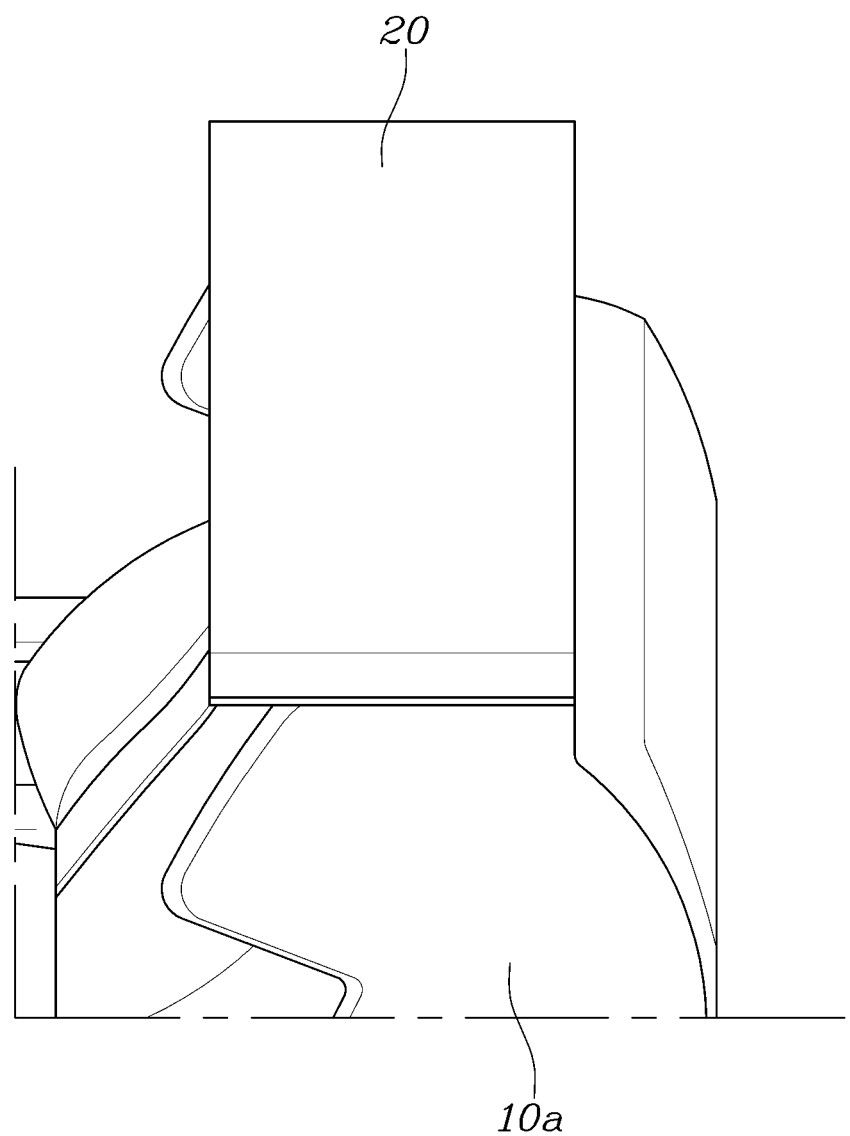
FIG. 11 is a view showing a configuration in which another exemplary airbag module, which has a different size from the airbag module shown in FIG. 10, is mounted.

FIG. 11 is a view showing a configuration in which another exemplary airbag module 20, which has a different size from the airbag module 20 shown in FIG. 10, is mounted. The plate 21 and the airbag module 20 may be formed so as to extend forward or may have various other shapes depending on the size of the seat 10 or the size of the airbag cushion 200.

Figure 12:
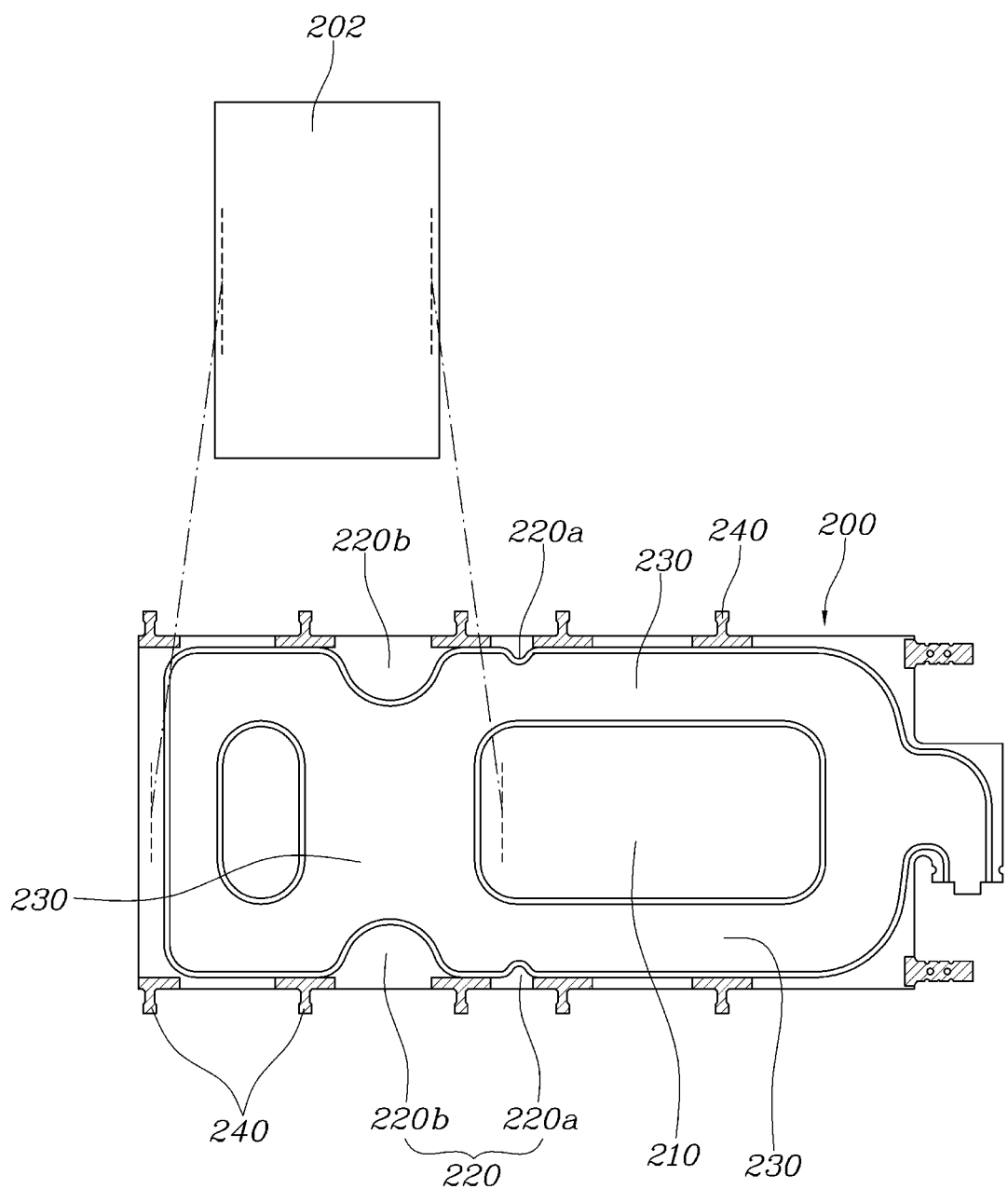
FIG. 12 is a view showing the configuration of the airbag cushion applicable to the present invention in an unfolded state.

FIG. 12 is a view showing the configuration of the airbag cushion 200 applicable to the present invention in an unfolded state.

Referring to the drawing, connection rings 240 may be provided on each of both side surfaces of the airbag cushion 200, and the active wire 300 and the connection wires 310 may be connected to the connection rings 240.

For example, the airbag cushion 200 may be formed so as to have a rectangular shape that is elongated in the forward-backward direction when unfolded. The connection rings 240 for connection of the active wire 300 and the connection wires 310 may be coupled to each of the left and right surfaces of the airbag cushion 200 and may be arranged in the longitudinal direction of the airbag cushion 200, i.e., the forward-backward direction.

Referring back to FIG. 3, the front portion of the airbag cushion 200, which covers the area ahead of the seat 10, includes a bent portion 200a, which is bent toward the occupant so that the occupant's upper body is directly loaded on the airbag cushion 200.

That is, the bent portion 200a formed at the front portion of the airbag cushion 200 is deployed so as to be bent toward the occupant. Accordingly, in the event of forward collision, the occupant's head moves forward and is loaded on the bent portion 200a.

The load of the occupant applied to the airbag cushion 200 is transmitted to the active wire 300 connected to each of both side surfaces of the airbag cushion 200. In this way, the airbag cushion 200 and the active wire 300 absorb kinetic energy of the occupant moving forward, thereby safely protecting the occupant.

According to the extent to which the bent portion 200a is bent, the airbag cushion 200 may directly support and protect the occupant's chest as well as the occupant's head.

Further, in the configuration shown in FIG. 5, the load of the occupant applied to the airbag cushion 200 is transmitted not only to the active wire 300 but also to the connection wires 310, whereby the kinetic energy of the occupant moving forward may be absorbed more reliably.

Figure 6:
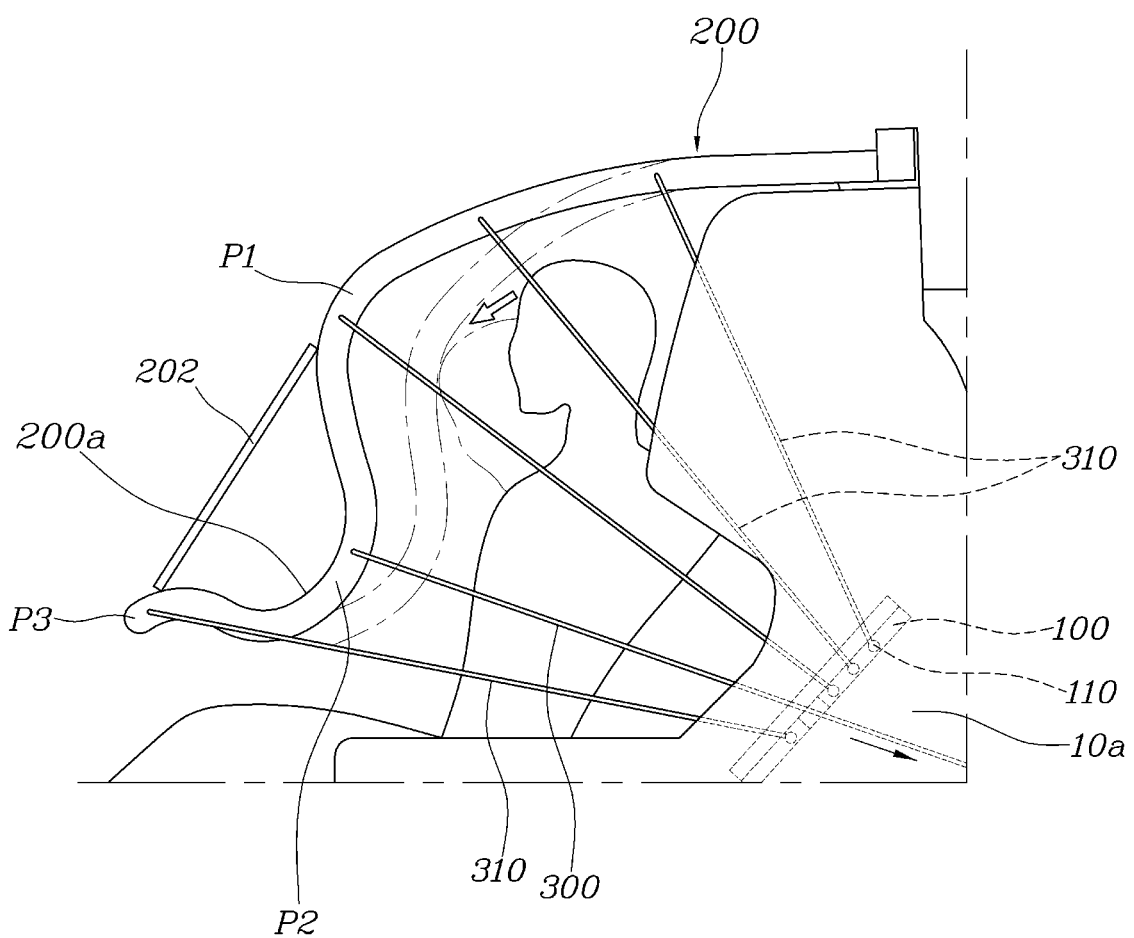
FIG. 6 is a side view showing a state in which an airbag cushion according to the present invention is pulled toward an occupant when deployed.

In addition, referring to FIG. 6, a tether 202 may be connected between a start point P1 and an end point P3 of the bent portion 200a.

For example, the tether 202 is deployed in a rectangular panel shape. The upper end of the tether 202 is fixed to the middle of the outer surface of the airbag cushion 200, and the lower end thereof is fixed to the lower end of the outer surface of the airbag cushion 200.

The length of the tether 202 in the deployment direction thereof is shorter than the length between the middle of the airbag cushion 200 and the lower end of the airbag cushion 200, to which the tether 202 is fixed. Accordingly, when the airbag cushion 200 is deployed, the bent portion 200a is formed so as to be bent toward the occupant by the tether 202, and the occupant's head is loaded on the bent portion 200a.

Referring to FIG. 12, the airbag cushion 200 includes lateral inactive zones 220 formed in both side surfaces thereof, into which gas is not injected. The bent portion 200a of the airbag cushion 200 is bent from a portion adjacent to the lateral inactive zones 220.

In one example, the lateral inactive zones 220 may be formed immediately behind the start point P1 of the bent portion 200a.

In detail, the airbag cushion 200 is provided with a diffuser at a rear side thereof, into which an inflator is inserted.

In addition, the airbag cushion 200 includes a central inactive zone 210 formed in a central portion thereof and active zones 230 formed on the left and right sides of the central inactive zone 210 so as to be connected to the diffuser. Gas supplied through the diffuser is not injected into the central inactive zone 210, but is uniformly injected into the active zones 230, whereby the airbag cushion 200 is deployed without being twisted.

The start point P1 of the bent portion 200a is formed at an end portion of the central inactive zone 210 that faces the front side of the airbag cushion 200. In order to clearly define a point at which the bent portion 200a is bent, the lateral inactive zones 220a are formed in a groove shape in both side surfaces of the airbag cushion 200 at a position immediately behind the start point P1 of the bent portion 200a. Accordingly, the bent portion 200a is smoothly bent.

The structure forming the lateral inactive zones 220a in order to facilitate bending of the airbag cushion 200 may be applied to a portion in front of the end point P3 of the bent portion 200a as well as a portion behind the start point P1 of the bent portion 200a. In this case, the bent shape of the bent portion 200a may be formed more stably.

In another example, the lateral inactive zones 220 may be formed at an intermediate point P2 of the bent portion 200a.

In detail, an active zone 230, into which gas is injected, is formed at the center of a portion extending from the central inactive zone 210 to the front side of the airbag cushion 200, i.e., between the lateral inactive zones 220b formed at the intermediate point P2 of the bent portion 200a. That is, the lateral inactive zones 220b are formed on both sides of the active zone 230.

The lateral inactive zones 220b formed on both sides of the intermediate point P2 of the bent portion 200a have lower support rigidity than the active zone 230 formed therebetween. Therefore, the lateral inactive zones 220b formed on both sides of the intermediate point P2 of the bent portion 200a may cause the bent portion 200a to be more easily bent at the intermediate point P2 thereof. As a result, when the airbag cushion 200 is deployed, the bent portion 200a may be more stably bent toward the occupant.

The extent to which the active zone 230 formed at the intermediate point P2 of the bent portion 200a protrudes toward the occupant may vary depending on the sizes of the lateral inactive zones 220b formed on both sides of the intermediate point P2 of the bent portion 200a. In this way, it is possible to adjust the occupant support area. In detail, as the sizes of the lateral inactive zones 220b increase, the protruding extent of the active zone 230 and the width thereof in the leftward-rightward direction decrease, and as the sizes of the lateral inactive zones 220b decrease, the protruding extent of the active zone 230 and the width thereof in the leftward-rightward direction increase.

Referring to FIG. 5, at least one active wire 300 may be connected to each of both side surfaces of the airbag cushion 200 between the intermediate point P2 and the end point P3 of the bent portion 200a.

In addition, at least one connection wire 310 may be connected to each of both side surfaces of the airbag cushion 200 between the start point P1 and the end point P3 of the bent portion 200a.

For example, when the active wire 300 is connected to the intermediate point P2 of the bent portion 200a and the connection wires 310 are connected to the start point P1 and the end point P3 of the bent portion 200a, the bent portion 200a may be more stably bent in a substantially triangular shape.

Alternatively, two or more active wires 300 may be connected to the intermediate point P2 of the bent portion 200a. In this case, the bent portion 200a may be bent in a polygonal shape having four or more corners. In this way, the bent portion 200a may be bent in various shapes.

In the present invention, according to a method of controlling deployment of the airbag for a seat, the controller may apply an operation command to the active mechanism 400 during operation of the airbag so that the active mechanism 400 pulls the active wire 300 in order to pull the airbag cushion 200 toward the occupant.

In addition, by virtue of the load limiting device 410 connected to the active mechanism 400, the active wire 300 may be released when pulled by the load of the occupant applied to the airbag cushion 200.

Hereinafter, deployment operation of the airbag for a seat according to the present invention will be described.

In the event of vehicle collision, the airbag controller applies an operation signal to the inflator so that the inflator explodes. Gas is generated by explosion of the inflator, and is supplied to the interior of the airbag cushion 200.

Subsequently, the airbag cushion 200 accommodated in the airbag module 20 in a state of being folded in a zigzag shape is deployed from the rear upper end of the seat 10 toward the front lower end of the seat 10.

In this process, due to the tether 202 fixed at both ends thereof to the middle portion and the end portion of the airbag cushion 200, the front portion of the airbag cushion 200 is bent toward the occupant. That is, the bent portion 200a is formed.

In addition, the active wire 300 connected to each of both side surfaces of the airbag cushion 200 is unfolded forward along with deployment of the airbag cushion 200. At this time, the middle portion of the active wire 300 is rotated with respect to the support member 100 in the direction in which the airbag cushion 200 is deployed.

In this way, since the active wire 300 is unfolded along with deployment of the airbag cushion 200, the airbag cushion 200 is deployed in a predetermined shape. In particular, in the case of a structure in which the connection wires 310 are connected to each of both side surfaces of the airbag cushion 200, the connection wires 310 are spread in the shape of ribs of a fan, and the active wire 300 and the connection wires 310 are tensioned, thereby more stably forming the deployment shape of the airbag cushion 200.

Further, since the active mechanism 400 operates to pull the active wire 300, the airbag cushion 200 is moved toward the occupant, whereby the occupant is loaded on the airbag cushion 200 in a short time.

Therefore, the airbag cushion 200 rapidly and stably restrains the occupant loaded thereon, thereby safely protecting the occupant.

Furthermore, since the bent portion 200a formed at the front portion of the airbag cushion 200 is deployed so as to be bent toward the occupant, the occupant's head is stably loaded on the airbag cushion 200. In addition, the load of the occupant applied to the airbag cushion 200 is transmitted to the active wire 300 and the connection wires 310 connected to each of both side surfaces of the airbag cushion 200. In this way, the airbag cushion 200, the active wire 300, and the connection wires 310 absorb kinetic energy of the occupant moving forward, thereby safely protecting the occupant with increased occupant restraining force.

As is apparent from the above description, the present invention provides an airbag for a seat, in which wires connected to an airbag cushion are pulled by an active mechanism during operation of the airbag and accordingly, the airbag cushion is pulled toward an occupant. Since the airbag cushion is pulled toward the occupant while being deployed, the occupant's body parts are rapidly loaded on the airbag cushion. As a result, the occupant is safely protected.

Further, since a bent portion formed at the front portion of the airbag cushion is deployed so as to be bent toward the occupant, the occupant's head is stably loaded on the airbag cushion. Furthermore, the load of the occupant applied to the airbag cushion is transmitted to the wires connected to both side surfaces of the airbag cushion. In this way, the airbag cushion and the wires absorb kinetic energy of the occupant moving forward, thereby safely protecting the occupant with increased occupant restraining force.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. An airbag for a seat having a first side portion and a second side portion positioned opposite to the first side portion, the airbag comprising:
   an airbag cushion having first and second side portions positioned opposite to each other and configured, when deployed, to cover areas in front of and above the seat;

a plurality of active wires including (1) a first active wire extending between the first side portion of the seat and the first side portion of the airbag cushion and (2) a second active wire extending between the second side portion of the seat and the second side portion of the airbag cushion;

an active mechanism coupled to the plurality of active wires and configured to pull the plurality of active wires toward an occupant seated at the seat;

a controller configured to control the active mechanism to pull the plurality of active wires;

a plurality of connection wires including (1) a first connection wire extending between the first side portion of the seat and the first side portion of the airbag cushion and (2) a second connection wire extending between the second side portion of the seat and the second side portion of the airbag cushion; and a plurality of support members including first and second support members respectively disposed at the first and second side portions of the seat, wherein the first and second active wires respectively extend through the first and second support members and are connected to the active mechanism, and the first and second connection wires are respectively hinged to the first and second support members.

2. The airbag according to claim 1, wherein, when the airbag cushion is deployed, the first and second connection wires are tensioned to cause the airbag cushion to be deployed in a predetermined shape.

3. The airbag according to claim 1, wherein the first and second support members are elongated in a deployment direction of the airbag cushion.

4. The airbag according to claim 1, wherein the plurality of active wires is connected to a portion of the airbag cushion that covers the area in front of the seat when deployed.

5. The airbag according to claim 1, further comprising a load limiting device connected to the active mechanism and configured to allow the plurality of active wires to be released by a load of the occupant applied to the airbag cushion.

6. The airbag according to claim 1, wherein the airbag cushion is configured to be deployed forward from an upper portion of the seat.

7. The airbag according to claim 1, further comprising an airbag module mounted on an upper portion of the seat, wherein the airbag cushion is stored folded in the airbag module.

8. The airbag according to claim 1, wherein:
the airbag cushion includes first and second connection rings respectively disposed at the first and second side portions of the airbag cushion,
the first active wire and the first connection wire are connected to the first connection ring, and
the second active wire and the second connection wire are connected to the second connection ring.

9. An airbag for a seat having a first side portion and a second side portion positioned opposite to the first side portion, the airbag comprising:
an airbag cushion having first and second side portions positioned opposite to each other and configured, when deployed, to cover areas in front of and above the seat;
a plurality of active wires including (1) a first active wire extending between the first side portion of the seat and the first side portion of the airbag cushion and (2) a second active wire extending between the second side portion of the seat and the second side portion of the airbag cushion;
an active mechanism coupled to the plurality of active wires and configured to pull the plurality of active wires toward an occupant seated at the seat; and
a controller configured to control the active mechanism to pull the plurality of active wires,
wherein the airbag cushion has a bent portion configured, when deployed, to cover the area in front of the seat and protrude toward the seated occupant such that an upper body of the occupant become directly loaded onto the airbag cushion.

10. The airbag according to claim 9, wherein the airbag cushion comprises a tether extending between two opposite end portions of the bent portion.

11. The airbag according to claim 9, wherein:
the airbag cushion includes first and second lateral inactive zones respectively disposed at the first and second side portions of the airbag cushion,
the airbag cushion is configured to prevent a gas injected to the airbag cushion from being injected into the first and second lateral inactive zones, and
the airbag cushion is bent at a portion adjacent to the first and second lateral inactive zones to form the bent portion.

12. The airbag according to claim 11, wherein the first and second lateral inactive zones are located adjacent to the bent portion.

13. The airbag according to claim 11, wherein the first and second lateral inactive zones are located within the bent portion.

14. The airbag according to claim 13, wherein:
the airbag cushion further comprises an active zone disposed between the first and second lateral inactive zones, and
the gas, when injected into the airbag cushion, is injected into the active zone.

15. The airbag according to claim 9, wherein at least one of the plurality of active wires is connected to one of the first and second side portions of the airbag cushion between intermediate and end portions of the bent portion.

16. The airbag according to claim 9, further comprising:
a first connection wire extending between the first side portion of the seat and the first side portion of the airbag cushion; and
a second connection wire extending between the second side portion of the seat and the second side portion of the airbag cushion,
wherein the first and second connection wires are respectively connected to the first and second side portions of the airbag cushion between start and end portions of the bent portion.

17. A method of controlling deployment of the airbag according to claim 1, the method comprising:
applying, by the controller, an operation command to the active mechanism during operation of the airbag to control the active mechanism to pull the plurality of active wires so that the airbag cushion is pulled toward the occupant.

18. The method according to claim 17, further comprising releasing, by a load limiting device connected to the active mechanism, the plurality of active wires when the plurality of active wires is pulled by a load of the occupant applied to the airbag cushion.

* * * * *